United States Patent [19]

De Filippo

[11] Patent Number: 5,738,413
[45] Date of Patent: Apr. 14, 1998

[54] HEADREST FOR MOTOR VEHICLE SEATS

[75] Inventor: Emilio De Filippo, Bruzolo, Italy

[73] Assignee: Gestind-M.B. Manifattura di Bruzolo S.p.A., Bruzolo, Italy

[21] Appl. No.: 766,205

[22] Filed: Dec. 12, 1996

[30] Foreign Application Priority Data

Jul. 16, 1996 [IT] Italy ................... TO96A0614

[51] Int. Cl.$^6$ ................................... A47C 7/36
[52] U.S. Cl. ................ 297/410; 297/404; 297/391
[58] Field of Search ................... 297/410, 391, 297/396, 404, 406, 408

[56] References Cited

U.S. PATENT DOCUMENTS

| 3,635,527 | 1/1972 | Weber | 297/410 |
| 4,111,484 | 9/1978 | Jaeger | 297/410 |
| 4,390,209 | 6/1983 | Izuno et al. | 297/410 |
| 4,650,250 | 3/1987 | Krugener et al. | 297/410 |

FOREIGN PATENT DOCUMENTS 2138079  2/1973  Germany ................... 297/410

Primary Examiner—Laurie K. Cranmer
Attorney, Agent, or Firm—Sughrue, Mion, Zinn, Macpeak & Seas, PLLC

[57] ABSTRACT

A headrest for motor vehicle seats having support rods frictionally slidable through respective tubular guide elements which are rigidly secured to the structure of a seat backrest. The support rods are slack fitted within the tubular guide elements so as to be forwardly and rearwardly tiltable around a lower transverse axis and are kept in a substantially centered equilibrium position by resilient members provided within the tubular guide elements in front and in the back of the support rods. In case of forward or rearward tilting of the headrest, positioning notches of the support rods are engaged by respective restraining members also housed within the tubular guide elements.

7 Claims, 1 Drawing Sheet

U.S. Patent  Apr. 14, 1998  5,738,413
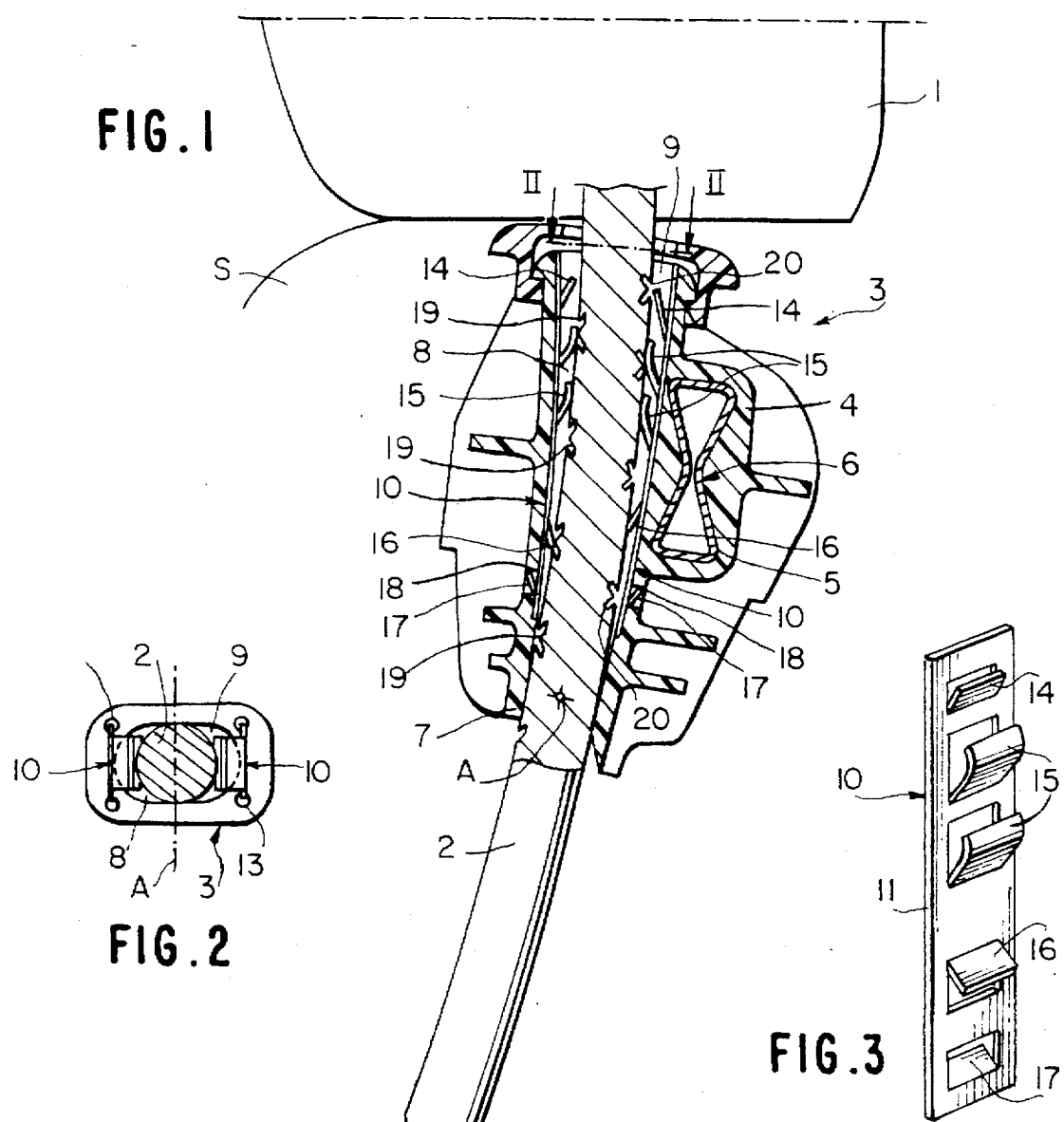
FIG.1
FIG.2
FIG.3
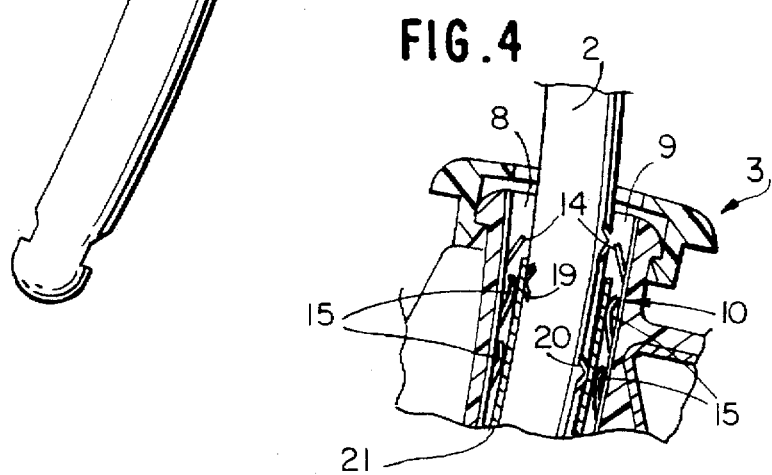
FIG.4

HEADREST FOR MOTOR VEHICLE SEATS

BACKGROUND OF THE INVENTION

The present invention is related to headrests for motor vehicle seats comprising a resilient body, a pair of parallel support rods projecting inferiorly from the resilient body, a pair of tubular guide elements to be rigidly connected to the structure of a seat backrest and through which the support rods are frictionally slidable, and wherein the tubular guide elements are provided with releasable restraining means co-operating with positioning notches formed on said support rods so as to prevent sliding thereof.

In the following specification and claims the terms "upper", "lower", "front", "rear" and the like are intended to be referred to the mounted condition of the headrest on top of a seat backrest on board of a motor vehicle, with respect to the forward travel direction thereof.

In the traditional headrests of the above referenced type the restraining means, which can be released so as to allow upwardly or downwardly sliding of the support rods in order to adjust the height of the headrest resilient body and also, whenever necessary, to withdraw tile support rods from the respective tubular guide elements so as to allow removal of the headrest, normally consist of a slider member urged by the action of a spring into sliding contact against the support rod, transversally thereto. A manually operable control push-button performs displacement of the slider member away from the support rod, against the action of the spring. The above construction is known for instance from European patent EP-B0582765 in the name of the same Applicant. This known solution, while being relatively convenient, has a drawback in that height adjustment operation of the headrest is relatively uncomfortable, particularly as raising thereof is concerned, since the user has to operate with both hands the control push-buttons associated to the two support rods and in some way displace upwardly the resilient body.

In order to overcome this drawback, in other known solutions a single restraining device associated to only one of the two support rods is employed, thus avoiding the second control push-button. In this way however the locking safety of the headrest in the set position is seriously jeopardized, with the risk of dangerous accidental separation of the headrest itself from the seat backrest in case of front or rear crash of the vehicle.

SUMMARY OF THE INVENTION

The object of the present invention is to provide a headrest for motor vehicle seats of the type set forth in the above, whose height adjustment does not require operation of any push-buttons, while ensuring a safe and sturdy restraint of the support rods relative to the tubular guide elements even in case of front or rear crash of the vehicle equipped with the headrest, so as to drastically reduce any risks of accidental removal of the headrest.

According to the invention, this object is achieved by virtue of the fact that the support rods of the headrest are slack fitted through said tubular guide elements so as to be forwardly and rearwardly tiltable substantially around a transverse axis placed in proximity of the lower ends of said tubular guide elements, of the fact that resilient means are interposed between said tubular guide elements and said support rods, acting so as to keep the support rods in a substantially centered equilibrium position within said tubular guide elements, and of the fact that said restraining means are formed by stationary retaining members also interposed between said tubular guide elements and said support rods and susceptible to engage said positioning notches of the support rods only following forward or rearward tilting thereof around said transverse axis.

Due to this idea of solution, normally the support rods are freely but frictionally slidable along the respective tubular guide elements, whereby height adjustment of the headrest is made extremely comfortable and easy. On the other hand, in case of forwardly or rearwardly displacement of the resilient body of the headrest, following a front or rear crash of the vehicle equipped with the headrest, the support rods are automatically locked relative to the tubular guide elements owing to forward or rearward tilting thereof, respectively, following which the retaining members engage corresponding positioning notches of the rods themselves.

Conveniently each of said tubular guide elements has a progressively enlarged cross-section from said transverse axis upwardly, so as to define a front interspace and a rear interspace with respect to the corresponding support rod, and these interspaces house two plates integrally formed with respective resilient wings in frictioned sliding contact against the corresponding support rod, and with respective tooth projections defining said retaining members.

To the aim of preventing sliding of the support rods both upwardly and downwardly, the positioning notches thereof and the tooth projections of said plates are inclined in part upwardly and in part downwardly.

In order to prevent abrasions of the support rod surfaces during their adjustment sliding along the tubular guide elements, intermediate protection sleeves may be interposed between said resilient wings of the two plates and the support rods.

BRIEF DESCRIPTION OF THE DRAWINGS

The invention will now be disclosed in detail with reference to the accompanying drawings, purely provided by way of non-limiting example, in which:

FIG. 1 is a diagrammatic and partially vertically sectioned view of a headrest for motor vehicle seats according to the invention, FIG. 2 is a horizontally sectioned view along line II—II of FIG. 1, FIG. 3 is a perspective view of a detail of the headrest, and FIG. 4 is a fragmentary view similar to FIG. 1 of an alternative embodiment of the invention.

DETAILED DESCRIPTION OF THE INVENTION

Referring to the drawings, a headrest for motor vehicle seats essentially comprises a resilient body or pillow 1, normally made of foamed plastic material and incorporating a supporting framework not shown in the drawings, since generally conventional, in turn rigidly or swingably connected to a pair of support rods 2, only one of which is shown in the drawings, projecting from the base of the resilient body 1. In the mounted condition of the headrest the resilient body 1 is located on top of the backrest S of a motor vehicle seat and its height is adjustable in the way which will be clarified here below, while the support rods 2 extend into the backrest S and are connected to the frame structure thereof such as also disclosed in the following.

The rods 2, which are parallel to each other, have a slightly curved or arcuate design, with their concavity facing towards the front of the vehicle (to the left with reference to FIG. 1), whereby when the resilient body 1 is raised, it is not displaced backwardly but rather it moves forwardly, in spite of the usual rearward slant of the backrest S.

Each support rod 2 is slidably fitted through a respective tubular guide element, generally indicated as 3, rigidly secured to the frame structure of the backrest S. The arrangement which will now be disclosed with reference to the tubular guide element 3 depicted in the drawings identically applies also to the other tubular guide element not shown in the drawings.

In the shown example, the tubular guide element 3 is formed by a plastic material bush overmoulded, in correspondence of a rear hollow enlarged portion 4 thereof, on a non-circular cross-section portion 5 of a metal bar 6 constituting the upper transverse member of the frame structure of the backrest S. It is however to be pointed out that this construction, while being advantageous, is purely indicative, since the tubular guide elements 3 may simply be formed by metal bushes fixed by welding to the transverse bar 6.

As clearly shown in FIG. 1, while the support rod 2 has a circular cross-section with a constant diameter, the cross-section of the bush 3 is progressively enlarged upwardly, starting from its lowermost end 7, so as to define, with respect to the support rod 2, a front interspace 8 and a rear interspace 9. Accordingly the support rod 2 is in direct contact with the inner wall of the bush 3 only in the area of the lower end 7 thereof, while superiorly the slack defined by the front interspace 8 and by the rear interspace 9 enables the support rod 2 to swing forwardly and rearwardly, substantially around a transverse axis A located near to the lower end 7 of the bush 3.

Reference numerals 10 designate two identical plates, normally made of metal, one of which is shown in better detail in FIG. 3, each having a substantially flat base 11 for housing thereof in a vertically fixed condition within the bush 3, respectively in correspondence of a front seat 12 and in correspondence of a rear seat 13 formed in this bush 3, one in front of the front interspace 8, and the other behind the rear interspace 9.

An upper tooth projection 14 which is inclined upwardly, two or more resilient curved wings 15, and a lower tooth projection 16 inclined downwardly are protruding from the base 11 of each plate 10.

Below the lower tooth projection 16, a lowermost engagement wing 17 is provided, protruding outwardly of the bush 3 and irreversibly engaged within a corresponding lowermost recess 18 thereof. The wings 15, 17 and the tooth projections 14 and 16 are normally formed integrally with the base by punching.

Upon their assembling within the bush 3, the two plates 10 are simply axially fitted from above into the respective seats 12, 13, up to snap engagement of the wings 17 within the respective recesses 18. In the fitted condition through the respective bush 3, each support rod 2 is arranged in frictioned sliding contact with the resilient wings 15 of the two respective plates 10. Accordingly, and as shown in FIG. 1, each support rod 2 is normally kept in a substantially centered equilibrium position within the respective bush 3, while the tooth projections 14 and 16 are spaced away from the front surface and, respectively, the rear surface of the support rod 2. Along these surfaces, the support rod 2 is formed with a front series and with a rear series, offset relative to each other, of engagement notches 20 inclined both upwardly and downwardly. These notches 19 and 20 can be engaged, such as explained here below, by the tooth projections 14 and 16 of the plates 10, while instead they can not be engaged by the resilient wings 15, due to the arcuate configuration of the free ends thereof.

Should the resilient body 1 of the headrest be pushed forwardly or rearwardly, for instance in case of a front or a rear crash of the vehicle equipped therewith, the support rods 2 will tilt forwardly or rearwardly substantially around the transverse axis A, due to elastic deformation of the resilient wings 15 of the front or rear plate 10, respectively. Owing to this tilting the corresponding surface of the support rods 2 will come into contact with the tooth projections 14,16 of the corresponding plate 10, whereby upwardly or downwardly sliding of the support rods 2 is then prevented by the engagement within the corresponding notches 19 of the corresponding tooth projection 14 or tooth projection 16.

In the absence of a forwardly or rearwardly force applied onto the resilient body 1, the support rods 2 are positioned in the substantially centered equilibrium condition shown in FIG. 1, thus allowing sliding of the support rods 2 along the respective bushes 3 so as to enable height adjustment of the headrest.

The variant shown in FIG. 4 is generally similar to the previously disclosed embodiment, and only the differences will be explained in detail, using the same reference numerals for identical or similar parts. This variant provides an intermediate protection sleeve 21, for instance made of plastic material, between the support rod 2 and the resilient wings 15 of the two plates 10. The sleeve 2i can be held stationary with respect to the plates 10 by any convenient means, or can be secured to the support rod 2, and in this case it will be formed with apertures in correspondence of the notches 18, 19 thereof. This sleeve 21 avoids direct contact of the resilient wings 15 against the surface of the support rod 2, thus preventing any abrasions thereof.

Naturally the details of construction and the embodiments may be widely varied with respect to what has been disclosed and illustrated, without thereby departing from the scope of the present invention, such as defined in the appended claims.

What is claimed is:

1. A headrest for a motor vehicle seat having a backrest with a bearing structure, comprising a resilient body, a pair of parallel support rods having respective lower ends projecting from the resilient body, a pair of tubular guide elements to be rigidly connected to said structure of the seat backrest and through which said support rods are frictionally slidable, wherein said tubular guide elements are provided with releasable restraining means co-operating with positioning notches formed on said support rods so as to prevent sliding thereof, and wherein said support rods are slack fitted through said tubular guide elements so as to be forwardly and rearwardly tiltable substantially around a transverse axis placed in proximity of said lower ends of said tubular guide elements, resilient means being interposed between said tubular guide elements and said support rods so as to keep said support rods in a substantially centered equilibrium position within said tubular guide elements, and said restraining means being formed by stationary retaining members also interposed between said tubular guide elements and said support rods and susceptible to engage said positioning notches of said support rods only following forward or rearward tilting thereof around said transverse axis.

2. Headrest according to claim 1, wherein each of said tubular guide elements has a progressively enlarged cross-section from said transverse axis upwardly, so as to define a front interspace and a rear interspace with respect to the corresponding support rod, and further comprising two plate members fitted in said interspaces and integrally formed with said resilient means respectively in frictioned sliding contact against the corresponding support rod and with respective tooth projections defining said retaining members.

3. Headrest according to claim 2, wherein said positioning notches of said support rods and said tooth projections of said plate members are inclined in part upwardly and in part downwardly.

4. Headrest according to claim 2, further comprising intermediate protection sleeves interposed between said resilient wings of said two plates members and said support rods.

5. Headrest according to claim 2, wherein said two plate members are snap-fit engaged within the respective tubular guide element.

6. Headrest according to claim 1, wherein said support rods are arcuate with their concavity facing forwardly.

7. Headrest according to claim 1, wherein said tubular guide elements are formed by moulded plastic material bushes and further comprising a mounting bar on which said two bushes are overmoulded, said bar being intended to constitute an upper transverse member of said backrest structure.

* * * * *